United States Patent [19]

Kiyoura et al.

[11] Patent Number: 5,336,440
[45] Date of Patent: Aug. 9, 1994

[54] PROCESS FOR DECOMPOSITION OF METHANOL

[75] Inventors: Tadamitsu Kiyoura; Takashi Jimbo; Yasuo Kogure; Kazuo Kanaya, all of Kanagawa, Japan

[73] Assignee: Mitsui Toatsu Chemicals, Inc., Tokyo, Japan

[21] Appl. No.: 975,951

[22] Filed: Nov. 13, 1992

Related U.S. Application Data

[63] Continuation of Ser. No. 793,288, Nov. 13, 1991, abandoned, which is a continuation of Ser. No. 551,088, Jul. 11, 1990, abandoned.

[30] Foreign Application Priority Data

Jul. 21, 1989 [JP] Japan ................... 1-187469

[51] Int. Cl.$^5$ ................................ C07C 1/02
[52] U.S. Cl. .................................... 252/373
[58] Field of Search .......................... 252/373

[56] References Cited

U.S. PATENT DOCUMENTS 4,847,000  7/1989  Dang Vu et al. ............ 252/373
4,855,267  9/1989  Cheng .

OTHER PUBLICATIONS

"Synthesis of Methanol" in *Catalysis*, vol. III, ed. by Paul H. Emmett, 1955, pp. 349-377 (Natta, G., Chapter 8).

Primary Examiner—Johann Richter
Assistant Examiner—Kimberly J. Kestler
Attorney, Agent, or Firm—Burns, Doane, Swecker & Mathis

[57] ABSTRACT

Methanol is decomposed in the presence of a catalyst containing chromium oxide and zinc oxide as main components and containing a compound of at least one element selected from the group consisting of alkali metals, alkali earth metals and lanthanides, while contents of iron and nickel in the catalyst are each maintained at 0.5% by weight or less. This process is characterized by (1) being excellent in stability at high temperatures, (2) preventing the catalyst from deteriorating, (3) inhibiting the production of by-products, and (4) obtaining a gas in which the $CO/H_2$ ratio is high.

5 Claims, No Drawings

PROCESS FOR DECOMPOSITION OF METHANOL

This application is a continuation of application Ser. No. 07/793,288 filed Nov. 13, 1991, now abandoned, which is a continuation of application Ser. No. 07/551,088, filed on Jul. 11, 1990, now abandoned.

BACKGROUND OF THE INVENTION (i) Field of the Invention

The present invention relates to a process for the decomposition of methanol. More specifically, the present invention relates to a process for decomposing methanol to obtain a gas containing $H_2$ and CO as main components.

(ii) Description of the Prior Art

In countries where raw materials for methanol are available at low costs, large-scale plants on a level of 3,000 tons/day have been built, and a large amount of methanol is exported from these countries to other consuming countries. Most of methanol is used as a raw material for chemicals such as formaldehyde. Furthermore, much attention is being paid to methanol as an inexpensive and clean energy source and a source of CO and $H_2$.

The gas containing CO and $H_2$ as the main components which can be obtained by decomposing methanol can also be used as a fuel for an internal combustion engine and the like. That is, a high-temperature exhaust gas from an internal combustion engine is utilized as a source of reaction heat necessary to decompose methanol, whereby the energy of the exhaust gas can be effectively recovered and thus the thermal economy of the internal combustion engine can be improved. Additionally, in this case, the production of aldehyde is inhibited and a clean exhaust gas is obtained advantageously.

Furthermore, CO and $H_2$ obtained by the decomposition of methanol are useful as raw materials for chemicals. That is, these compounds are important as essential raw materials for the manufacture of aldehydes by oxo synthesis, the manufacture of acetic acid by the carbonylation of methanol, the manufacture of diamines by the $H_2$ reduction of dinitrotoluene, the manufacture of phosgene by the reaction of CO with chlorine, the manufacture of an isocyanate (TDI) by the reaction of a diamine with phosgene, and the like.

In general, CO and $H_2$ are industrially obtained by the steam reforming or the partial oxidation of hydrocarbons such as methane, naphtha, crude oil and coal. On the other hand, the process for forming CO and $H_2$ by the decomposition of methanol has advantages such as the employment of lower reaction temperatures, a lower capital investment in facilities and less labor for operation, as compared with the above-mentioned conventional methods. It is fair to say that the process for the preparation of CO and $H_2$ by the decomposition of methanol is economical due to the use of inexpensive methanol.

In the decomposition of methanol, a catalyst is used, and many catalysts for this application have been suggested. They are catalysts, on a carrier such as previously treated alumina, which are active metallic compounds, particularly platinum group elements, base metal elements such as copper, nickel, chromium and zinc, and their oxides. In addition, it has also been suggested to directly use, in the decomposition reaction, a mixed catalyst comprising oxides of the base metals, particularly a catalyst for methanol synthesis having a chromium oxide/zinc oxide system, a copper oxide/zinc oxide system or a copper oxide/zinc oxide/aluminum oxide system without using any carrier.

The conventional catalysts have the following drawbacks:

(1) The catalyst on a carrier is poor in durability. Particularly with regard to the catalyst containing a noble metal or a copper group element on a carrier, its catalytic activity tends to deteriorate due to impurities present in the raw material, and what is worse, the copper group element catalyst is poor in heat resistance.

(2) As compared with the catalyst having a carrier, the catalyst for methanol synthesis is superior in durability, but when the latter catalyst is used, dimethyl ether, methane and high-boiling products are produced as by-products.

(3) It is known that when a conventional catalyst is used, the decomposition reaction of methanol is slow and carbon is deposited on the catalyst. Thus, when the catalyst is used for a long period of time, the catalytic activity tends to deteriorate (AICHE, Spring National Meeting, "Methanol Dissociation for Fuel Use" 1984; EP B1 18700; U.S. Pat. No. 4,780,300; and Japanese Laid-open Patent Publication Nos. 51-119002, 51-122102 and 52-52902). In order to solve the above-mentioned problems, a method has been suggested in which methanol and water are fed to a catalyst layer to partially bring about the steam reforming of methanol, and a carbonaceous material or its precursor deposited on the catalyst is then removed therefrom by steam distillation.

As described above, when methanol is fed together with water to the catalyst layer, the $CO/H_2$ ratio in the produced gas falls. Such a gas composition is inconveniently unsuitable for the synthesis of aldehydes by oxo synthesis or the synthesis of acetic acid by using methanol and CO in which CO only is required.

In the conventional methanol decomposition process, the catalyst is low in stability and durability as described above, and the deterioration of the catalyst is observed at high temperatures. Furthermore, the gas obtained by the conventional decomposition process contains a considerable amount of by-products such as methane, dimethyl ether and high-boiling products, and therefore this kind of gas is required to be purified, when CO and $H_2$ in the gas are used as the raw materials for producing chemicals.

SUMMARY OF THE INVENTION

An object of the present invention is to provide a process for the decomposition of methanol at a high efficiency but not having such problems as in the conventional methods.

Another object of the present invention is to provide a process for the decomposition of methanol by which the decomposition of methanol proceeds at a high efficiency even in the case that water does not coexist with methanol to be fed to a catalyst layer and in which a carbonaceous material is not deposited even in the course of a long-term operation, so that the catalytic activity does not deteriorate.

Still another object of the present invention is to provide a process for the preparation of a gas in which the $CO/H_2$ ratio is high.

In the practice of the decomposition of methanol in accordance with the present invention, the conversion is high, nonetheless the production of by-products, dimethyl ether and methane, is very little and further the production of high-boiling products is also little. In consequence, the produced $CO/H_2$ gas can be used without purification as a raw material for the preparation of chemicals. Therefore, according to the present invention, no purification step for the $CO/H_2$ gas is needed and thus the present invention is economical. In addition, a smaller amount of the high-boiling products is formed and the deposition of carbon on the catalyst is decreased, and thus the life of the catalyst can be prolonged and a continuous operation is possible for a long period of time, even if water is not fed together with methanol. Accordingly, a gas having a high $CO/H_2$ ratio can be obtained.

According to the present invention, there is provided a process for the decomposition of methanol or a mixture of methanol and water to prepare a mixed gas of CO and $H_2$ which comprises carrying out the decomposition reaction of methanol in the presence of a catalyst containing chromium oxide and zinc oxide as main components and containing a compound of at least one element selected from the group consisting of alkali metals, alkali earth metals and lanthanides, wherein the contents of iron and nickel in the catalyst are each maintained at 0.5% by weight or less.

DESCRIPTION OF THE PREFERRED EMBODIMENTS

A catalyst containing chromium oxide and zinc oxide as the main components which is used in the present invention can be prepared as follows:

(a) An alkali metal compound such as potassium carbonate is added to a chromium compound such as chromic anhydride and a zinc compound such as zinc oxide or zinc hydroxide, and they are then wet-kneaded. Afterward, the mixture is subjected to extruding, drying, calcination at 300–600° C. and hydrogen reduction.

(b) A basic material such as aqueous ammonium, an alkali metal hydroxide or an alkali metal carbonate is added to a mixed aqueous solution of a chromium salt such as chromium nitrate, chromium sulfate and the like and a zinc salt such as zinc nitrate and the like in order to precipitate a co-precipitate of chromium and zinc. The precipitate is then impregnated with a predetermined amount of an alkali metal compound or a rare earth compound, followed by drying, molding and calcination at 300–600° C.

(c) A known catalyst for methanol synthesis which comprises a chromium oxide—zinc oxide system is impregnated with an aqueous solution in which a salt such as potassium carbonate and the like is dissolved, followed by drying.

In general, a mixing ratio between $Cr_2O_3$ and ZnO in the catalyst is often such that $ZnO/Cr_2O_3$ is from 2 to 4 (ratio by weight).

It is necessary that the contents of iron and nickel present in the catalyst are each maintained at 0.5% by weight or less, preferably 0.2% by weight or less. A compound containing at least one element selected from the group consisting of alkali metals, alkaline earth metals and lanthanides (hereinafter referred to as "alkali metal compound or the like") is added to the catalyst in which each concentration of iron and nickel is maintained at less than the above-mentioned upper limit.

Effects obtained by adding the alkali metal compound or the like to the catalyst system can be exerted by maintaining each concentration of iron and nickel at less than the above-mentioned upper limit. These effects are (1) to improve the activity of the catalyst, (2) to inhibit the production of by-products such as dimethyl ether and methane, (3) to prevent a carbonaceous material from being deposited on the catalyst so as to permit a long-term operation even if water is not fed together with alcohol, and (4) to obtain a gas in which the $CO/H_2$ ratio is high. It should be here noted that when each amount of iron and nickel is in excess of the above-mentioned upper limit, unpreferable effects take place all the more by adding the alkali metal compound or the like to the catalyst. That is, the secondary production of hydrocarbons such as methane and higher alcohols increases; the higher alcohols are converted into aldehydes or olefins, and high-boiling products are formed therefrom by polymerization or condensation reaction; and due to the presence of the high-boiling products, a carbonaceous material tends to be deposited on the catalyst, and the pressure loss on the catalyst layer increases for a long time and the catalyst layer is sealed.

Typical examples of the alkali metal compound which can be added to the catalyst include carbonates and bicarbonates of potassium and sodium. Typical examples of the alkaline earth metal compound which can be added to the catalyst include magnesium oxide, calcium oxide, calcium hydroxide, magnesium hydroxide and barium oxide. Furthermore, examples of the lanthanides include lanthanum oxide, lanthanum hydroxide, cerium oxide, cerium hydroxide and an oxide of didymium which is a mixture of rare earth elements.

The amount of the above-mentioned additives to be used is preferably in the range of 0.5 to 5% by weight based on the total weight of chromium oxide and zinc oxide which are the main components. When the amount of the additives is less than 0.5% by weight, the improvement of the catalytic activity and the inhibition effect of the by-products are poor, and conversely when it is more than 5% by weight, the catalytic activity deteriorates and by-products such as methane increase unpreferably.

The decomposition reaction of methanol in accordance with the present invention is carried out by the use of methanol having a purity of 99% or more or a mixture of methanol and water in the presence of the above-mentioned catalyst. In general, the amount of water which is fed together with methanol to a reaction vessel is adjusted in view of the desired ratio between $H_2$ and CO.

However, the catalyst of the present invention is characterized in that even if methanol is decomposed without adding water, the deposition of carbon on the catalyst is controlled, whereby the activity of the catalyst can be retained for a long-term operation.

In the process of the present invention, needless to say, it is possible to change the $CO/H_2$ ratio by adding methanol as well as water, as described above. When the catalyst of the present invention is used, the reaction rate of the methanol decomposition in the case that water is added is 5 to 10% lower than in the case that no water is added, in contrast to the conventional catalyst, particularly a Cu system or an Ni system catalyst. However, the presence of water has little influence on the deposition of carbon and the activity of the catalyst.

The decomposition temperature which is often used in the present invention is in the range of from 270 to 400° C., particularly 290 to 350° C. and the decomposition pressure is in the range of from atmospheric pressure to 20 kg/cm². The feed rate of methanol to the catalyst is preferably in the range of from 0.2 to 2 hr$^{-1}$ in terms of LHSV. A multitubular type reaction vessel is often used.

Now, the present invention will be described in more detail in reference to examples.

However, the scope of the present invention should not be limited to these examples.

EXAMPLE 1

Chromic anhydride and zinc oxide were kneaded together with a small amount of water using a kneader, and potassium carbonate was then added thereto, followed by further kneading. The resulting paste was extruded and then subjected to drying at 120° C. and calcination at 450° C. Next, a reduction treatment was carried out by the use of a $H_2$ gas in a usual manner in order to prepare a catalyst. The thus-obtained catalyst had a size of 3 mm$\phi \times$ 3 mm and a composition of 27% by weight of $Cr_2O_3$, 70% by weight of ZnO, 2.9% by weight of $K_2CO_3$, 0.02% by weight of Fe and 0.01% by weight of Ni. In addition, the specific surface area of the catalyst was 125 m²/g.

A stainless steel reaction tube having an inner diameter of 1 inch was packed with 100 g (80 ml) of the above-mentioned catalyst in a nitrogen gas stream and then heated to 340° C. from the outside in a sand fluidizing bath. Afterward, nitrogen was switched to methanol and the latter was then fed to the catalyst bed. In this case, prior to the feed of methanol thereto, the latter was passed through a carburetor so as to be changed into methanol vapor and then heated up to 350° C. by using a preheater. The feed rate of methanol was 0.8 hour$^{-1}$ in terms of LHSV, and the reaction pressure was 10 kg/cm².

The gas at the outlet of the reaction vessel was analyzed in a conventional manner, and as a result, it was confirmed that the conversion of methanol was 99%, the selectivity of CO was 97%, the selectivity of hydrogen was 98%, the selectivity of dimethyl ether was 0.05% and the selectivity of methane was 0.04%, and high-boiling products were scarcely observed.

The reaction was continued under the above-mentioned conditions for a period of 120 days, and in this case, the conversion of methanol was maintained at a level of 98%. At this point of time, the reaction was brought to an end, and the catalyst was taken out. Afterward, the carbonaceous material deposited on the catalyst was analyzed, and as a result, the amount of the deposited carbon was 1.5% by weight based on the weight of the catalyst.

COMPARATIVE EXAMPLE 1

The decomposition reaction of methanol was carried out under the same reaction conditions as in Example 1 by the use of the same catalyst as in Example 1 except that potassium carbonate was not added. The gas at the outlet of the reaction vessel was analyzed. The conversion of methanol was 97%, the selectivity of CO was 95%, the selectivity of hydrogen was 96%, the selectivity of dimethyl ether was 0.47%, and the selectivity of methane was 0.35%. Furthermore, after the reaction for 120 days, the conversion of methanol was 95%, and the amount of carbon deposited on the catalyst was 3.5% by weight.

COMPARATIVE EXAMPLES 2 to 4

The reaction was carried out under the same conditions as in Example 1 by the use of the same catalyst as in Example I except that contents of iron and nickel were different. The obtained results are set forth in Table 1.

TABLE 1

| No. | Ni wt % | Fe wt % | Conversion of Methanol % | Selectivity of $CH_4$ % | Selectivity of DME % | Amount of Deposited Carbon on Catalyst wt % |
|---|---|---|---|---|---|---|
| 2 | 1 | 0.5 | 99 | 2.1 | 0.92 | 9.2 |
| 3 | 0.5 | 0.1 | 99 | 1.4 | 0.85 | 7.1 |
| 4 | 0.1 | 0.5 | 99 | 0.6 | 0.28 | 5.0 |

$CH_4$: Methane
DME: Dimethyl ether
Ni: Percent by weight of Ni based on the total weight of catalyst
Fe: Percent by weight of Fe based on the total weight of catalyst
Amount of Deposited Carbon: Percent by weight of deposited carbon based on the total weight of catalyst

EXAMPLE 2

A catalyst for methanol synthesis having a composition of 27.8% by weight of chromium oxide, 71% by weight of zinc oxide, 0.02% by weight of Ni and 0.019% by weight of Fe was impregnated with an aqueous potassium carbonate solution, followed by drying to prepare a catalyst. In this case, the amount of the impregnated potassium carbonate was 1.8% by weight. The decomposition reaction of methanol was carried out under the same reaction conditions as in Example 1. According to the analytical results, the conversion of methanol was 99%, the selectivity of CO was 96%, the selectivity of $H_2$ was 97%, the selectivity of $CH_4$ was 0.04%, and the selectivity of dimethyl ether was 0.05%. The secondary production of high-boiling products was not observed substantially.

EXAMPLE 3

An aqueous methanol solution comprising 94% by weight of methanol and 6% by weight of water was vaporized and then subjected to decomposition reaction under the same reaction conditions as in Example 2 by the use of the same catalyst as in Example 2. According to the analyzed values of the gas at the outlet of the reaction vessel, the conversion of methanol was 99%, the selectivity of CO was 96%, the selectivity of hydrogen was 97%, the selectivity of $CH_4$ was 0.01% and the selectivity of dimethyl ether was 0.06%.

EXAMPLES 4 to 9

Various additives were added to a catalyst comprising 22% by weight of chromium oxide, 77% by weight of zinc oxide, 0.03% by weight of Ni and 0.06% by weight of Fe to prepare catalysts, and the decomposition reaction of methanol was effected under the same conditions as in Example 1. The obtained results are set forth in Table 2.

TABLE 2

| No. | Additive | Amount of Additive wt % | Conversion of Methanol % | Selectivity of $CH_4$ % | Selectivity of DME % |
| --- | --- | --- | --- | --- | --- |
| 4 | BaO | 2.2 | 99 | 0.11 | 0.12 |
| 5 | Ca(OH)$_2$ | 2.2 | 99 | 0.09 | 0.10 |
| 6 | Ce$_2$O$_3$ | 2.2 | 99 | 0.08 | 0.09 |
| 7 | La$_2$O$_3$ | 2.2 | 99 | 0.10 | 0.10 |
| 8 | Didymium Oxide | 2.2 | 99 | 0.09 | 0.11 |
| 9 | K$_2$CO$_3$—Ce$_2$O$_3$ (1:1) | 2.2 | 99 | 0.05 | 0.06 |

Amount of Additive: Percent by weight of the additive based on the total weight of chromium oxide and zinc oxide
$CH_4$: Methane
DME: Dimethyl ether

EXAMPLE 10

A catalyst comprising 27.8% by weight of chromium oxide and 71.1% by weight of zinc oxide was impregnated with an aqueous potassium carbonate solution to prepare a catalyst containing 1.5% by weight of $K_2CO_3$. In the catalyst, the Fe content was 0.015% by weight and the Ni content was 0.018% by weight. The catalyst was made into tablets each having a size of 3 mm$\phi$×3 mm and a specific surface area of 130 m$^2$/g.

A stainless steel reaction tube having an inner diameter of 1 inch which was lined with copper was packed with 100 g (about 70 ml) of the above-mentioned catalyst, and methanol containing 6.5% by weight of water was then introduced into the catalyst bed at 1 hour$^{-1}$ in terms of LHSV via a carburetor and a preheater to perform the decomposition reaction of methanol at a reaction temperature (outlet temperature of the catalyst bed) of 360° C.

The gas at the outlet of the reaction vessel was analyzed, and as a result, the conversion of methanol was 99%, the selectivity of CO was 97%, the selectivity of $H_2$ was 98%, the selectivity of dimethyl ether was 0.05% and the selectivity of methane was 0.02%. After the reaction was continued for 260 days, the conversion of methanol was 99%, and the amount of a carbonaceous material deposited on the catalyst was 2.5% by weight.

EXAMPLE 11

A stainless steel reaction tube having an inner diameter of 1 inch was packed with 100 g of the same catalyst as in Example 10. Methanol (concentration 99.8%) was then introduced into the reaction tube at 1 hour$^{-1}$ in terms of LHSV via a carburetor and a preheater to perform the decomposition reaction of methanol at a reaction temperature (outlet temperature of the catalyst bed) of 350° C.

The gas at the outlet of the reaction vessel was analyzed, and as a result, the conversion of methanol was 99%, the selectivity of CO was 98%, the selectivity of $H_2$ was 98%, the selectivity of dimethyl ether was 0.04% and the selectivity of methane was 0.03%. After the reaction was continued for 265 days, the conversion of methanol was 99%. Furthermore, a temperature change curve regarding the catalyst bed scarcely changed between an early stage and a terminal stage of the reaction. The amount of a carbonaceous material deposited on the catalyst was 2.6% by weight, and it was not observed that this value was different from that of a system in which methanol of the raw material and water were coexistent.

EXAMPLES 12 TO 14

COMPARATIVE EXAMPLES 5 TO 8

An aqueous sodium carbonate solution was added to a mixed aqueous solution of zinc nitrate and chromium nitrate to prepare a co-precipitated hydrogel of chromium and zinc. The thus-obtained hydrogel precipitate was sufficiently washed with water to obtain a gel, and a part of this gel was dried at a temperature of from 120 to 150° C. and then tableted into tablets each having a size of 3 mm$\phi$×3 mm, followed by calcination at 500° C. to prepare catalyst (A). The latter (A) was then analyzed, and as a result, the $Cr_2O_3$ content was 30% by weight, the ZnO content was 70% by weight and each content of iron and nickel was 0.05% by weight or less. The above-mentioned hydrogel was impregnated with an aqueous potassium carbonate solution, dried at 120° C. molded and then calcined to prepare the following catalysts (B) to (G) in which the content of potassium carbonate was different:

Catalyst (B): $K_2CO_3$ content=0.1 wt %
Catalyst (C): $K_2CO_3$ content=0.6 wt %
Catalyst (D): $K_2CO_3$ content=1.2 wt %
Catalyst (E): $K_2CO_3$ content=3.0 wt %
Catalyst (F): $K_2CO_3$ content=5.0 wt %
Catalyst (G): $K_2CO_3$ content=8.0 wt %

The catalysts (A) to (G) were used in the reaction in the same reaction apparatus and under the same reaction conditions as in Example 11, and the results are set forth in Table 3. All of these catalysts were subjected to a reduction treatment by the use of a $H_2$ gas in a conventional manner prior to using,

EXAMPLE 15

The same procedure as in Example 11 was carried out except that catalyst (D) was used and 5% by weight of water was added to methanol which was being fed, The results are set forth in Table 3.

TABLE 3 (I)

| | | Conversion of Methanol (%) | |
| --- | --- | --- | --- |
| | Catalyst | After 2 days | After 100 days |
| Comp. Ex. 5 | A | 97 | 93 |
| Comp. Ex. 6 | B | 99 | 95 |
| Example 12 | C | 99 | 97 |
| Example 13 | D | 99 | 99 |
| Example 14 | E | 99 | 99 |
| Comp. Ex. 7 | F | 99 | 98 |
| Comp. Ex. 8 | G | 98 | 94 |
| Example 15 | D | 99 | 99 |

TABLE 3 (II)

|  | Selectivity of Methane (%) | |
| --- | --- | --- |
|  | After 2 days | After 100 days |
| Comp. Ex. 5 | 0.36 | 0.45 |
| Comp. Ex. 6 | 0.15 | 0.22 |
| Example 12 | 0.07 | 0.07 |
| Example 13 | 0.04 | 0.06 |
| Example 14 | 0.04 | 0.07 |
| Comp. Ex. 7 | 0.12 | 0.28 |
| Comp. Ex. 8 | 0.40 | 0.60 |
| Example 15 | 0.06 | 0.07 |

TABLE 3 (III)

|  | Selectivity of DME (%) | |
| --- | --- | --- |
|  | After 2 days | After 100 days |
| Comp. Ex. 5 | 0.51 | 0.87 |
| Comp. Ex. 6 | 0.25 | 0.33 |
| Example 12 | 0.10 | 0.21 |
| Example 13 | 0.05 | 0.08 |
| Example 14 | 0.05 | 0.06 |
| Comp. Ex. 7 | 0.04 | 0.05 |
| Comp. Ex. 8 | 0.03 | 0.04 |
| Example 15 | 0.05 | 0.08 |

DME: Dimethyl ether

TABLE 3 (IV)

|  | Amount of Deposited Carbon on Catalyst after 100 Days (wt %) |
| --- | --- |
| Comp. Ex. 5 | 3.7 |
| Comp. Ex. 6 | 2.0 |
| Example 12 | 1.9 |
| Example 13 | 1.7 |
| Example 14 | 1.6 |
| Comp. Ex. 7 | 1.9 |
| Comp. Ex. 8 | 3.9 |
| Example 15 | 1.6 |

Amount of deposited carbon: Percent by weight of carbon based on the total weight of the catalyst.

What is claimed is:

1. A process for the decomposition of methanol or a mixture of methanol and water to prepare a mixed gas of CO and $H_2$ which comprises carrying out the decomposition reaction of methanol in the temperature range of from 270 to 400° C. and in the pressure range of atmospheric pressure to 20 kg/cm$^2$ and in the presence of a catalyst containing chromium oxide and zinc oxide as main components and containing a compound selected from the group consisting of lanthanum oxide, lanthanum hydroxide, cerium oxide, cerium hydroxide and an oxide of didymium which is a mixture of rare earth elements said compound being present in an amount of from 0.5 to 5% by weight based on the total weight of chromium oxide and zinc oxide wherein the contents of iron and nickel in the catalyst are each maintained at 0.5% by weight or less.

2. A process according to claim 1 wherein the weight ratio of zinc oxide to chromium oxide in the catalyst is from 2 to 4.

3. A process according to claim 1 wherein the content of each of iron and nickel is 0.2% by weight or less.

4. A process according to claim 1 wherein the decomposition is carried out by the use of a multitubular type reaction vessel.

5. A process according to claim 1 wherein the decomposition temperature is from 290 to 350° C.

* * * * *